(12) United States Patent
Kobayashi

(10) Patent No.: US 12,038,077 B1
(45) Date of Patent: Jul. 16, 2024

(54) STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/041,020

(22) PCT Filed: Nov. 4, 2021

(86) PCT No.: PCT/JP2021/040627
§ 371 (c)(1),
(2) Date: Feb. 8, 2023

(87) PCT Pub. No.: WO2023/079641
PCT Pub. Date: May 11, 2023

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .......................... F16H 49/001; F16H 2049/003
See application file for complete search history.

(56) References Cited

U.S. PATENT DOCUMENTS

| | | | | |
|---|---|---|---|---|
| 3,424,432 A | * | 1/1969 | Humphreys | B05B 7/26 415/124.2 |
| 10,352,426 B2 | * | 7/2019 | Kobayashi | F16H 55/18 |
| 11,028,915 B2 | * | 6/2021 | Handa | F16H 57/021 |

FOREIGN PATENT DOCUMENTS

| | | |
|---|---|---|
| JP | H03119643 U | 12/1991 |
| JP | 2014199130 A | 10/2014 |
| JP | 2018035897 A | 3/2018 |
| JP | 2019105314 A | 6/2019 |
| WO | 2016194066 A1 | 12/2016 |

OTHER PUBLICATIONS

International Search Report (PCT/ISA/210) with Written Opinion (PCT/ISA/237) mailed on Dec. 7, 2021, by the Japanese Patent Office as the International Searching Authority for International Application No. PCT/JP2021/040627, 8 pages.

* cited by examiner

*Primary Examiner* — Jake Cook
(74) *Attorney, Agent, or Firm* — BUCHANAN INGERSOLL & ROONEY PC

(57) ABSTRACT

In a strain wave gearing, in order to regulate axial-direction movement of an externally toothed gear thereof, first balls are directly interposed between a first annular end surface and a device housing, whereby the first annular end surface and the device housing are in rolling contact with one another. Similarly, second balls, are directly interposed between a second annular end surface and an output shaft, whereby the second annular end surface and the output shaft are in rolling contact with one another. No contact occurs other than rolling contact of contact portions. Additionally, pressure is applied in the axial direction to the portions that make rolling contact, and axial-direction rattling is eliminated, whereby axial-direction movement of the externally toothed gear is reliably suppressed, and generation of high thrust force is prevented.

7 Claims, 2 Drawing Sheets

STRAIN WAVE GEARING

TECHNICAL FIELD

The present invention relates to a strain wave gearing provided with a mechanism for regulating axial-direction movement of an externally toothed gear.

BACKGROUND ART

Known examples of strain wave gearings include flat strain wave gearings. Flat strain wave gearings are susceptible to "walking," in which an externally toothed gear moves in the axial direction (thrust direction). Normally, a regulating member (F/S deviation-preventing part: plate, retaining ring, or the like) for regulating movement of the externally toothed gear is arranged in order to regulate axial-direction movement of the externally toothed gear to within a permissible variable range (Patent Literature 1 and 2). It has also been proposed that, inter alia, an endless spring or the like be arranged at a site on the externally toothed gear (Patent Literature 3), or the externally toothed gear be configured as a double helical gear.

PRIOR-ART LITERATURE

Patent Literature

Patent Literature 1: JP 2014-199130 A
Patent Literature 2: JPU H03-119643 A
Patent Literature 3: WO2016/194066

DISCLOSURE OF THE INVENTION

Problems to be Solved by the Invention

However, in prior-art mechanisms for regulating axial-direction movement of an externally toothed gear in a strain wave gearing, problems are presented in that axial-direction displacement, even if very small, does occur in the externally toothed gear, and friction loss caused by sliding of portions in contact with a regulating member is high.

It is accordingly an object of the present invention to provide a strain wave gearing in which axial-direction displacement of an externally toothed gear can be suppressed and in which friction loss caused by sliding of a portion in contact with a member for regulating axial-direction movement of the externally toothed gear can be greatly reduced.

Means of Solving the Problems

In order to solve the above-mentioned problems, a strain wave gearing according to the present invention has
  a fixed-side first internally toothed gear and a rotating-side second internally toothed gear arranged so as to be lined up coaxially in an axial direction,
  a radially flexible cylindrical externally toothed gear arranged coaxially inside the first and second internally toothed gears,
  a wave generator that causes the externally toothed gear to flex in a radial direction and partially mesh with each of the first and second internally toothed gears, and that causes meshing positions of the gears to move in a circumferential direction, and
  a first regulating part arranged on a side of the first internally toothed gear in the axial direction and a second regulating part arranged on a side of the second internally toothed gear in the axial direction, the first and second regulating parts sandwiching the externally toothed gear, in order to regulate axial-direction movement of the externally toothed gear,
  the strain wave gearing being characterized in that:
  the first regulating part is provided with a first raceway groove formed in a first annular end surface of the externally toothed gear, the first annular end being on the side of the first internally toothed gear in the axial direction, a fixed-side raceway groove formed in a fixed-side member that faces the first raceway groove in the axial direction, and a plurality of first rolling elements sandwiched between the first raceway groove and the fixed-side raceway groove in a state that allows rolling; and
  the second regulating part is provided with a second raceway groove formed in a second annular end surface of the externally toothed gear, the second annular end being on the side of the second internally toothed gear in the axial direction, a rotating-side raceway groove formed in a rotating-side member that faces the second raceway groove in the axial direction and that rotates integrally with the second internally toothed gear, and a plurality of second rolling elements sandwiched between the second raceway groove and the rotating-side raceway groove in a state that allows rolling.

The first rolling elements are preferably held between the first raceway groove and the fixed-side raceway groove in the first regulating part in a state of prescribed pressurization in the axial direction. Additionally, the second rolling elements are preferably held between the second raceway groove and the rolling-side raceway groove in the second regulating part in a state of prescribed pressurization in the axial direction.

The rim thickness of the externally toothed gear is increased, whereby the first and second annular end surfaces of the externally toothed gear on both sides thereof in the axial direction are provided with widths that allow formation of the first and second raceway grooves in which the rolling elements roll, and the first and second regulating parts can be provided.

Effects of the Invention

In the strain wave gearing according to the present invention, the rolling elements are directly interposed between the externally toothed gear and the fixed-side member and between the externally toothed gear and the rotating-side member on the two sides, the two members regulating axial-direction movement of the externally toothed gear, whereby the externally toothed gear is rolling contact with the fixed-side member and with the rotating-side member. No contact occurs other than rolling contact of contact portions, and therefore it is possible to greatly reduce friction loss caused by sliding of the contact portions. Additionally, pressure is applied along the axial direction to the portions that make rolling contact, and axial-direction rattling is eliminated, whereby axial-direction movement of the externally toothed gear is reliably suppressed, and generation of high thrust force is prevented. As a result, the efficiency of the strain wave gearing can be improved.

MODE FOR CARRYING OUT THE INVENTION

An embodiment of a strain wave gearing to which the present invention is applied is described below with reference to the accompanying drawings. The embodiment described below indicates one example of the present invention and is not intended to limit the present invention to said embodiment.

Figure 1:
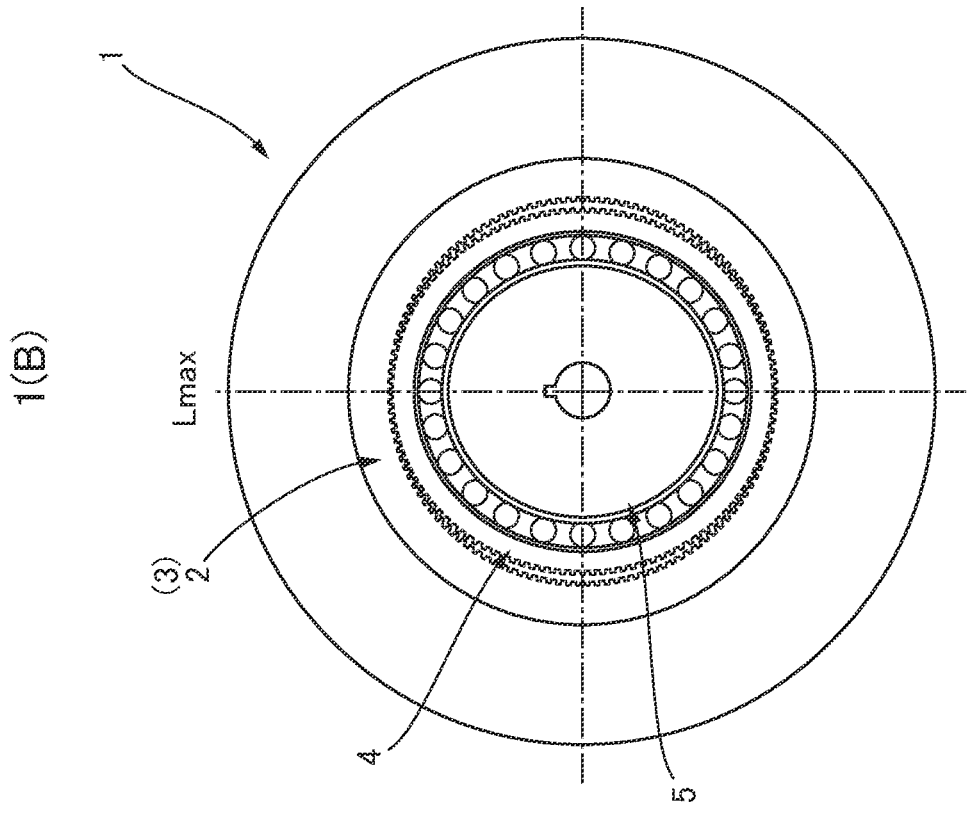
FIG. 1(A) is a schematic longitudinal cross-sectional view of a strain wave gearing to which the present invention is applied.
FIG. 1(B) is an explanatory diagram showing a state of meshing between an internally toothed gear and an externally toothed gear.
Figure 1:
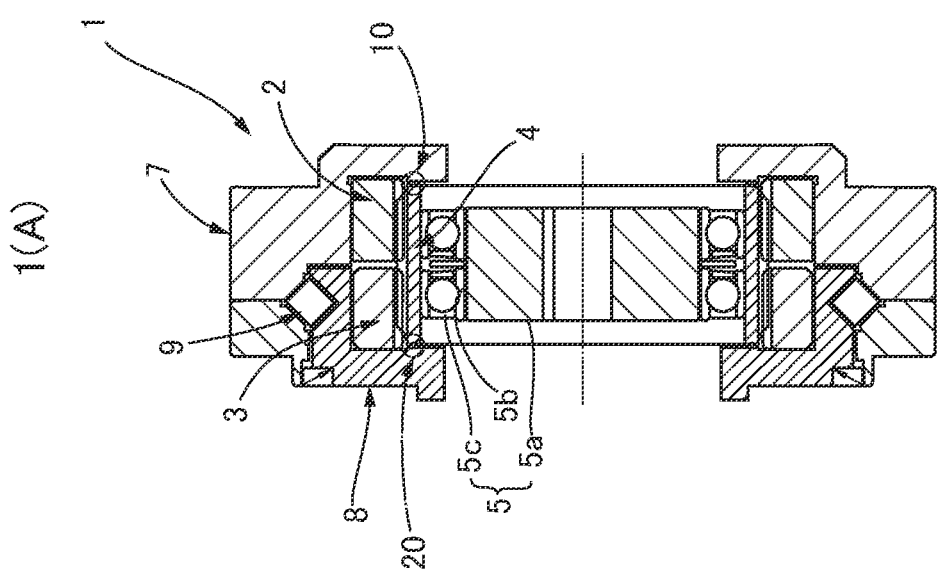

FIG. 1(A) is a schematic longitudinal cross-sectional view of a flat strain wave gearing according to the present embodiment, and FIG. 1(B) is an explanatory diagram showing a state of meshing between an internally toothed gear and an externally toothed gear. The flat strain wave gearing 1 (referred to below simply as "strain wave gearing 1") is provided with a fixed-side first internally toothed gear 2 and a rotating-side second internally toothed gear 3 arranged so as to be lined up coaxially in the axial direction, a radially flexible cylindrical externally toothed gear 4 arranged coaxially inside the first and second internally toothed gears 2, 3, and a wave generator 5 arranged coaxially inside the externally toothed gear 4. The wave generator 5 is provided with a rigid plug 5a, and a wave bearing 5c that is mounted on an ellipsoidal outer peripheral surface 5b of the rigid plug 5a and that is ellipsoidally flexed. The fixed-side first internally toothed gear 2 in the present example is securely fastened to a device housing 7 that is a fixed-side member, and the rotating-side second internally toothed gear 3 is securely fastened to a discoid output shaft 8 that is a rotating-side member. The output shaft 8 is supported in a rotatable state by the device housing 7 via a bearing 9.

As shown in FIG. 1(B), the externally toothed gear 4 is caused to flex in an ellipsoidal shape by the wave generator 5 and meshes with each of the first and second internally toothed gears 2, 3, at both end portions on a long axis Lmax of the ellipsoidal shape. The number of teeth on the fixed-side first internally toothed gear 2 is greater than the number of teeth on the externally toothed gear 4 by 2n (where n is a positive integer), and the number of teeth on the rotating-side second internally toothed gear 3 is equal to the number of teeth on the externally toothed gear 4. When the wave generator 5 is caused to rotate by a motor or the like, the positions where the fixed-side first internally toothed gear 2 and the externally toothed gear 4 mesh with one another move in the circumferential direction, and the externally toothed gear 4 rotates at a speed that corresponds to the difference between the numbers of teeth. The second internally toothed gear 3, which has the same number of teeth as the externally toothed gear 4, rotates integrally with the externally toothed gear 4, and rotation of the externally toothed gear 4 is outputted from the output shaft 8 via the second internally toothed gear 3.

In order to regulate axial-direction movement of the externally toothed gear 4, the strain wave gearing 1 is provided with a first regulating part 10 arranged on the side of the first internally toothed gear 2 in the axial direction and a second regulating part 20 arranged on the side of the second internally toothed gear 3 in the axial direction, the first and second regulating parts 10, 20 sandwiching the externally toothed gear 4.

Figure 2:
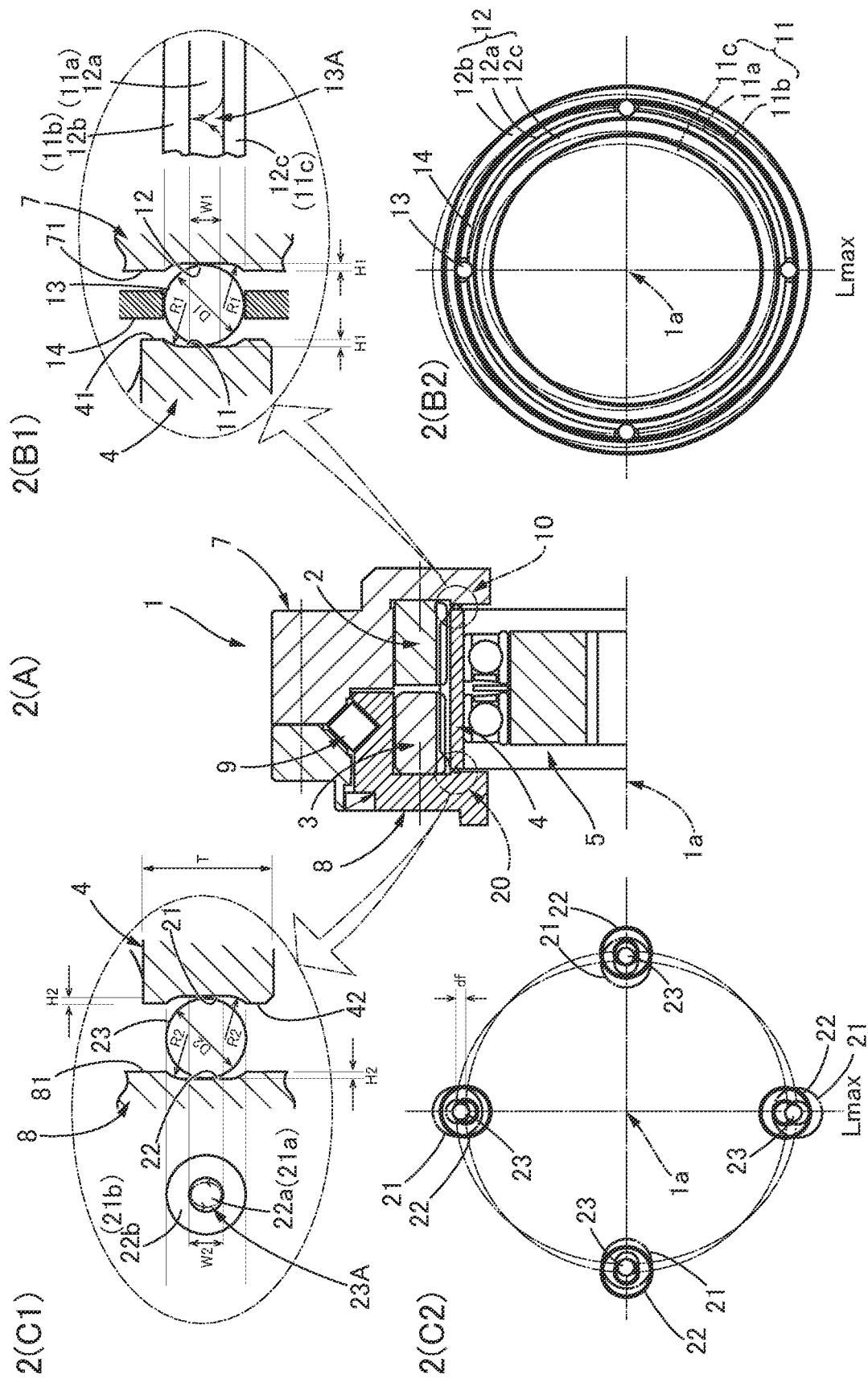
FIG. 2(A) is a schematic half-longitudinal cross-sectional view of the externally toothed gear, FIG. 2(B1) is an explanatory diagram showing a first regulating part, FIG. 2(B2) is an explanatory diagram showing raceway grooves in the first regulating part, FIG. 2(C1) is an explanatory diagram showing a second regulating part, and FIG. 2(C2) is an explanatory diagram showing raceway grooves in the second regulating part.

FIG. 2(A) is a schematic half-longitudinal cross-sectional view of the externally toothed gear, FIG. 2(B1) explanatory view of the cross-sectional shape of the first regulating part and raceway grooves formed therein, FIG. 2(B2) is an explanatory diagram showing the raceway grooves in the first regulating part, FIG. 2(C1) is an explanatory diagram showing the cross-sectional shape of the second regulating part and raceway grooves formed therein, and FIG. 2(C2) is an explanatory diagram showing the raceway grooves in the second regulating part.

As shown in FIG. 2(B1), the first regulating part 10 is provided with: a first raceway groove 11 formed in a first annular end surface 41 of the externally toothed gear 4, the first annular end surface 41 being located on the side of the first internally toothed-gear 2 in the axial direction; a fixed-side raceway groove 12 formed in an annular end surface 71 of the device housing 7, which is a fixed-side member facing the first raceway groove 11 in the axial direction; a plurality of first balls 13 (first rolling elements) sandwiched between the first raceway groove 11 and the fixed-side raceway groove 12 in a state that allows rolling; and a retainer 14 for holding the first balls 13 at prescribed intervals in the circumferential direction. Prescribed pressure is imparted in the axial direction from the side of the fixed-side raceway groove 12, sandwiching the first balls 13, to the first raceway groove 11 formed in the first annular end surface 41 of the externally toothed gear 4. The axial-direction position of the fixed-side raceway groove 12 relative to the first raceway groove 11 is set such that a suitable pressurization state is achieved.

As shown in FIG. 2(C1), the second regulating part 20 is provided with: second raceway grooves 21 formed in a second annular end surface 42 of the externally toothed gear 4, the second annular end surface 42 being located on the side of the second internally toothed gear 3 in the axial direction; rotating-side raceway grooves 22 formed in an annular end surface 81 of the output shaft 8, which is a rotating-side member facing the second raceway grooves 21 in the axial direction; and a plurality of second balls 23 (second rolling elements) sandwiched between the second raceway grooves 21 and the rotating-side raceway grooves 22 in a state that allows rolling. Prescribed pressure is imparted in the axial direction from the side of rotating-side raceway grooves 22, sandwiching the second balls 23, to the second raceway grooves 21 formed in the second annular end surface 42 of the externally toothed gear 4. The axial-direction position of the rotating-side raceway grooves 22 relative to the second raceway grooves 21 is set such that a suitable pressurization state is achieved.

The first regulating part 10 is arranged between the fixed-side device housing 7 and the externally toothed gear 4, in which the externally toothed gear rotates at a reduced rate while the strain wave gearing 1 is operating. With reference to FIGS. 2(B1) and 2(B2), each of the first raceway groove 11 on the side of the externally toothed gear 4 and the fixed-side raceway groove 12 on the side of the device housing 7 is a circular raceway groove centered on an axis 1a, the two grooves 11, 12 being formed in symmetrical configurations facing one another at a given spacing in the axial direction. As indicated by narrow chain lines in FIG. 2(B2), the first raceway groove 11 on the side of the externally toothed gear 4, which is flexed in the ellipsoidal shape, is flexed from a circular shape into an ellipsoidal shape relative to the fixed-side raceway groove 12 shown by thick solid lines. Circumferential-direction portions of the first raceway groove 11 are repeatedly displaced by a given amplitude (df) in the radial direction as the wave generator 5 rotates. The fixed-side raceway groove 12, which is circular, and the first raceway groove 11, in which portions are repeatedly displaced in the radial direction, are formed such that the first balls 13 are held in a state that allows rolling between the raceway grooves. Four or more first balls 13 are inserted between the raceway grooves and are held at equiangular intervals in the circumferential direction by the retainer 14. For example, as shown in FIG. 2(B2), four first balls 13 are inserted.

The first raceway groove 11 and the fixed-side raceway groove 12 of the first regulating part 10 are provided with flat groove bottom surfaces 11a, 12a, and outer-peripheral-side groove side surfaces 11b, 12b and inner-peripheral-side groove side surfaces 11c, 12c that are formed from arc-shaped recessed surfaces and that link, in a respective manner, to the radial-direction outer peripheral edge and the radial-direction inner peripheral edge of the groove bottom surfaces 11a, 12a. The groove depth H1 of the first raceway groove 11 and the fixed-side raceway groove 12 can be set to 0.07D1-0.09D1, where D1 is the diameter of the first balls 13.

$$0.07D1 \leq H1 \leq 0.09D1$$

Between the fixed-side raceway groove 12, which is circular, and the first raceway groove 11, in which each portion in the circumferential direction is repeatedly displaced in the radial direction while the first raceway groove 11 is flexed in the ellipsoidal shape, the first balls 13 roll along a wave-shaped trajectory having a prescribed amplitude in the radial direction for each single rotation of the wave generator 5, as indicated by chain-line arrows 13A in FIG. 2(B1). The width W1 of the groove bottom surfaces 11a, 12a is set at least to df, where df is the amount of radial-direction flexing of the ellipsoidally flexed externally toothed gear 4 at the positions on the long axis Lmax, so that such movement of the first balls 13 is not impeded.

$$W1 \geq df$$

The radius of curvature R1 of the arc-shaped recessed surfaces defining the outer-peripheral-side groove side surfaces 11b, 12b and the inner-peripheral-side groove side surfaces 11c, 12c is set to 0.52D1-0.7D1 so as not to interfere with the first balls 13 rolling around within the grooves.

$$0.52D1 \leq R1 \leq 0.7D1$$

The second regulating part 20 is arranged between the output shaft 8 and the externally toothed gear 4, which rotates at the same rate about the axis 1a. With reference to FIGS. 2(C1) and 2(C2), each of the second raceway grooves 21 on the side of the externally toothed gear 4 and the rotating-side raceway grooves 22 on the side of the output shaft 8 is a circular discrete raceway groove (raceway pocket) arranged at equiangular intervals about the axis 1a. The second raceway grooves 21 and the rotating-side raceway grooves 22, which form pairs of discrete raceway grooves facing one another at a given spacing in the axial direction, are formed at four or more positions at equiangular intervals on the same circle centered on the axis 1a. At each position, one second ball 23 is held between the second raceway groove 21 and the rotating-side raceway groove 22 in a state that allows rolling. For example, as shown in FIG. 2(C2), discrete raceway grooves are formed at four locations, individual second balls 23 being held in each of the discrete raceway grooves. As indicated by narrow chain lines in FIG. 2(C2), the circular second raceway grooves 21 at the four locations on the side of the externally toothed gear 4, which is flexed in the ellipsoidal shape, are displaced by a given amplitude in the radial direction as the wave generator 5 rotates relative to the rotating-side raceway grooves 22 formed at the four locations shown by thick solid lines. The circular rotating-side raceway grooves 22, which are positioned on the same circle, and the circular second raceway grooves 21, which are repeatedly displaced in the radial direction, are formed such that the second balls 23 are held in a state that allows rolling between the raceway grooves.

The second raceway grooves 21 and the rotating-side raceway grooves 22, which are discrete raceway grooves having circular contours, are provided with flat groove bottom surfaces 21a, 22a of a prescribed size, and inner-peripheral-side surfaces 21b, 22b that are formed from arc-shaped recessed surfaces and that surround the groove bottom surfaces 21a, 22a. The groove depth H2 of the second raceway grooves 21 and the rotating-side raceway grooves 22 can be set to 0.07D2-0.09D2, where D2 is the diameter of the second balls 23.

$$0.07D2 \leq H2 \leq 0.09D2$$

The second balls 23, which roll between the second raceway grooves 21 and the rotating-side raceway grooves 22, move so as to describe ellipses within the grooves for each single rotation of the wave generator 5, as indicated by chain-line arrows 23A in FIG. 2(C1). The diameter W2 of the groove bottom surfaces 21a, 22a is set at least to df so that such movement of the second balls 23 is not impeded.

$$W2 \geq df$$

The radius of curvature R2 of the arc-shaped recessed surfaces defining the inner-peripheral-side surfaces 21b, 22b of the second raceway grooves 21 and the rotating-side raceway grooves 22 is set to 0.52D2-0.7D2 so as not to interfere with the second balls 23 rolling around within the grooves.

$$0.52D2 \leq R2 \leq 0.7D2$$

In the present example, balls having the same diameter are used as the first and second balls 13, 23, satisfying D1=D2=D. However, it is also possible to use balls having different diameters.

Next, the rim thickness of the externally toothed gear 4 is increased, whereby the first annular end surface 41 and the second annular end surface 42 on the two sides of the externally toothed gear 4 are provided with widths that allow formation of the first and second raceway grooves 11, 21. Because the fatigue strength of a steel externally toothed gear decreases when the rim thickness thereof is increased, it is necessary to select the material of the externally toothed gear so that the required fatigue strength is obtained when the rim thickness is increased. For example, the externally toothed gear 4 is constructed from an aluminum material or a resin material.

In the present example, the radial-direction width T1 (thickness) of the first annular end surface 41 is set to (df+0.65D1) or greater, and the radial-direction width T2 (thickness) of the second annular end surface 42 is set to (df+0.65D2) or greater, so that the first raceway groove 11 and the second raceway grooves 12 described above can be formed on the first and second annular end surfaces 41, 42 on the two sides of the externally toothed gear 4. Because D1=D2=D in the present example, the rim thickness T is set to (df+0.65D) or greater across the entirety of the externally toothed gear 4 in the tooth width direction.

$$T \geq df + 0.65D$$

As described above, in order to regulate axial-direction movement of the externally toothed gear 4 in the strain wave gearing 1, the first regulating part 10 is arranged on one axial-direction side of the externally toothed gear 4, and the second regulating part 20 is arranged on the other axial-direction side thereof. The first regulating part 10 is configured such that the first balls 13 are directly interposed between the first annular end surface 41 on one side of the externally toothed gear 4 and a fixed-side end surface formed on the device housing 7, which is a fixed-side member. Similarly, the second regulating part 20 is configured such that the second balls 23 are directly interposed between the second annular end surface 42 on the other side of the externally toothed gear 4 and a rotating-side end surface formed on the output shaft 8, which is a rotating-side member. No contact occurs other than rolling contact of contact portions for regulating axial-direction movement of the externally toothed gear 4, and therefore it is possible to greatly reduce friction loss caused by sliding of the contact portions. Additionally, pressure is applied in the axial direction to the portions that make rolling contact, and axial-direction rattling is eliminated, whereby axial-direction movement of the externally toothed gear 4 is reliably suppressed, generation of high thrust force is prevented, and the efficiency of the strain wave gearing can be greatly improved.

The invention claimed is:

1. A strain wave gearing comprising:
a fixed-side first internally toothed gear and a rotating-side second internally toothed gear arranged so as to be lined up coaxially in an axial direction,
a radially flexible cylindrical externally toothed gear arranged coaxially inside the first and second internally toothed gears,
a wave generator that causes the externally toothed gear to flex in a radial direction and partially mesh with each of the first and second internally toothed gears, and that causes meshing positions of the gears to move in a circumferential direction, and
a first regulating part arranged on a side of the first internally toothed gear in the axial direction and a second regulating part arranged on a side of the second internally toothed gear in the axial direction, the first and second regulating parts sandwiching the externally toothed gear, in order to regulate axial-direction movement of the externally toothed gear,
the strain wave gearing being characterized in that:
the first regulating part is provided with a first raceway groove formed in a first annular end surface of the externally toothed gear on the side of the first internally toothed gear in the axial direction, a fixed-side raceway groove formed in a fixed-side member facing the first raceway groove in the axial direction, and a plurality of first rolling elements sandwiched between the first raceway groove and the fixed-side raceway groove in a state that allows rolling; and
the second regulating part is provided with a second raceway groove formed in a second annular end surface of the externally toothed gear on the side of the second internally toothed gear in the axial direction, a rotating-side raceway groove formed in a rotating-side member that faces the second raceway groove in the axial direction and that rotates integrally with the second internally toothed gear, and a plurality of second rolling elements sandwiched between the second raceway groove and the rotating-side raceway groove in a state that allows rolling.

2. The strain wave gearing according to claim 1, wherein the first rolling elements are held between the first raceway groove and the fixed-side raceway groove in the first regulating part in a state in which prescribed pressure is imparted in the axial direction, and
the second rolling elements are held between the second raceway groove and the rotating-side raceway groove in the second regulating part in a state in which prescribed pressure is imparted in the axial direction.

3. The strain wave gearing according to claim 2, wherein:
each of the first raceway groove and the fixed-side raceway groove of the first regulating part is a continuous circular raceway groove centered on an axis;
first balls, which are the first rolling elements, are held by a retainer in a circumferentially spaced state between the circular raceway grooves;
each of the second raceway groove and the rotating-side raceway groove of the second regulating part is a plurality of discrete raceway grooves arranged at prescribed angular intervals about the axis; and
individual second balls, which are the second rolling elements, are held between the discrete raceway grooves that face one another in the axial direction.

4. The strain wave gearing according to claim 3, wherein:
at least four first rolling elements are held between the circular raceway grooves of the first regulating part at positions that are equiangularly spaced in a circumferential direction; and
the discrete raceway grooves of the second regulating part are formed at least at four locations at equiangular intervals on a same circle, one of the second rolling elements being held in each of the discrete raceway grooves.

5. The strain wave gearing according to claim 3, wherein:
the circular raceway grooves are provided with flat groove bottom surfaces having a prescribed width in a radial direction, and outer-peripheral-side groove side surfaces and inner-peripheral-side groove side surfaces that are formed from arc-shaped recessed surfaces and that link respectively to a radial-direction outer peripheral edge and a radial-direction inner peripheral edge of the groove bottom surfaces; and
the discrete raceway grooves are provided with flat groove bottom surfaces of a prescribed size, and inner-peripheral-side surfaces that are formed from arc-shaped recessed surfaces and that surround the groove bottom surfaces.

6. The strain wave gearing according to claim 5, wherein:
the externally toothed gear is caused to flex in an ellipsoidal shape by the wave generator and meshes with the first and second internally toothed gears at positions on a long axis of the ellipsoidal shape;
a groove depth of the circular raceway grooves is 0.07D1-0.09D1, where D1 is a diameter of the first balls;
a width of the groove bottom surfaces of the circular raceway grooves is at least 0.5df, where df is a flexing width at long-axis positions of the externally toothed gear that is flexed in the ellipsoidal shape;

a radius of curvature of the arc-shaped recessed surfaces defining the outer-peripheral-side groove side surfaces and the inner-peripheral-side groove side surfaces is 0.52D1-0.7D1;

a groove depth of the discrete raceway grooves is 0.07D2-0.09D2, where D2 is a diameter of the second balls;

the groove bottom surfaces of the discrete raceway grooves are at least of such size as to be circular or ellipsoidal bottom surfaces in which the flexing width df serves as the diameter or the long axis; and a radius of curvature of the arc-shaped recessed surfaces defining the inner-peripheral-side surfaces of the discrete raceway grooves is 0.52D2-0.7D2.

7. The strain wave gearing according to claim 6, wherein:

a radial-direction width of the first annular end surface of the externally toothed gear is at least $df+0.65D1$, and a radial-direction width of the second annular end surface is at least $df+0.65D2$.

* * * * *